United States Patent [19]

Aarts

[11] Patent Number: 5,259,237

[45] Date of Patent: Nov. 9, 1993

[54] METHOD AND APPARATUS FOR TESTING A FILLED AND CLOSED FLEXIBLE PACKAGE FOR LEAKAGE

[75] Inventor: Mathias L. C. Aarts, Bilthoven, Netherlands

[73] Assignee: Sara Lee/DE N.V., NLX

[21] Appl. No.: 883,452

[22] Filed: May 15, 1992

[30] Foreign Application Priority Data

May 17, 1991 [NL] Netherlands .................. 9100867

[51] Int. Cl.⁵ .............................................. G01M 3/36
[52] U.S. Cl. ............................................. 73/49.3; 73/52
[58] Field of Search ............ 73/49.3, 52, 45.4, 862.641

[56] References Cited

U.S. PATENT DOCUMENTS

| 3,805,595 | 4/1974 | Dobry | 73/49.3 |
| 4,517,827 | 5/1985 | Tapscott | 73/49.3 X |
| 4,697,452 | 10/1987 | Prakken | 73/49.3 |
| 4,706,494 | 11/1987 | Creed et al. | 73/49.3 |
| 4,955,226 | 9/1990 | Beaty et al. | 73/49.3 |

FOREIGN PATENT DOCUMENTS 151735 7/1987 Japan .................... 73/49.3

*Primary Examiner*—Hezron E. Williams
*Assistant Examiner*—Joseph W. Roskos
*Attorney, Agent, or Firm*—Longacre & White

[57] ABSTRACT

Method and apparatus for leak-testing a filled and closed flexible package, in which the package is placed on a vertically movable support member and is compressed between the support member and a pressure member bearing on the top of the package as a result of relative movement of these members towards each other. The change in the pressure is measured for a fixed measuring time and from this the presence or absence of a leak is determined.

The support member supports the package, substantially completely filled with a liquid product, by means of springs. The package is compressed by lowering the pressure member onto the package, the support member thereby being pressed downwards against the spring force acting on the support member.

For a fixed measuring time, the change in the spring force is measured for determining possible leakage of liquid from the compressed package.

4 Claims, 1 Drawing Sheet

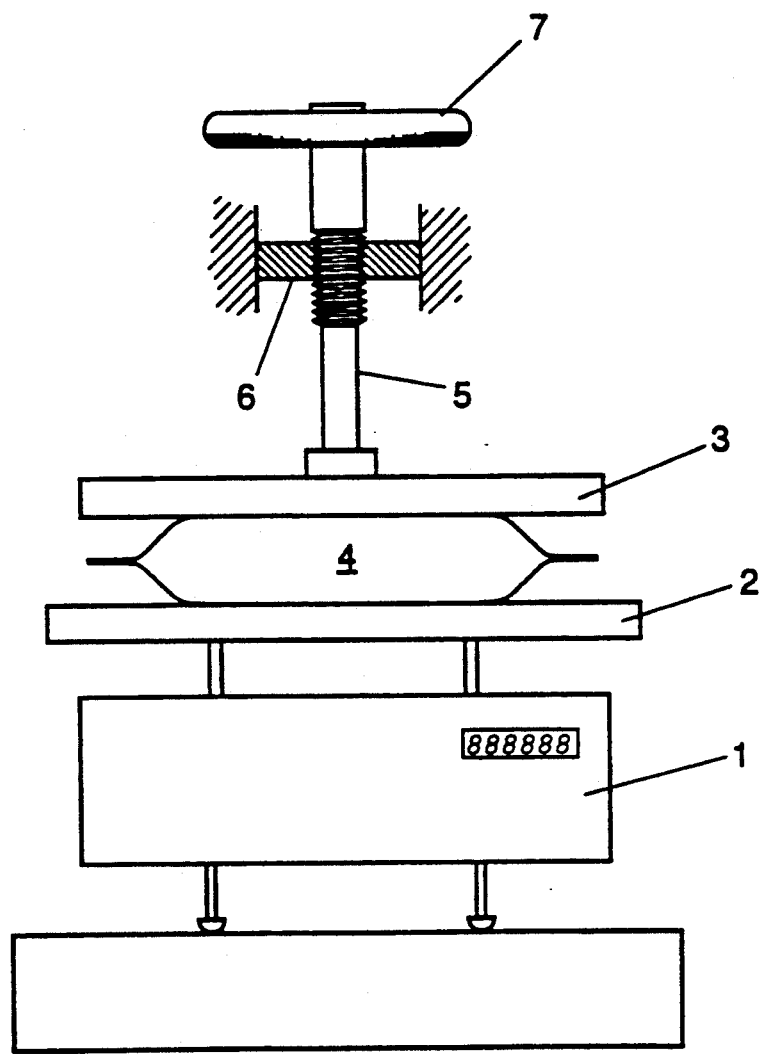

METHOD AND APPARATUS FOR TESTING A FILLED AND CLOSED FLEXIBLE PACKAGE FOR LEAKAGE

This invention relates to a method for testing a filled and closed flexible package for leakage, in which the package is placed on a vertically movable support member, the package is subsequently compressed between the support member and a pressure member bearing on the top of the package as a result of relative movement of these members towards each other, and the change in the pressure on the compressed package is measured for a fixed measuring time and from this the presence or absence of a leak in the package is determined.

Such a method is disclosed in U.S. patent specification No. 4,706,494. According to this patent specification, the sheet-like seal of a package is tested for leakage. The package is partly filled with a product with a free space present above it, under the closure. The package is placed on the support member adapted in shape to the lower portion of the package and is subsequently compressed between this support member and the pressure member pressing against the sealing sheet of the package and designed as a spherical ram. Of these two members, either the support member or the pressure member is arranged immovably, while the other member can be moved towards the rigidly arranged member for exerting pressure on the package. This pressure can be exerted by virtue of the movable member being connected to a piston rod and a piston movable within an air cylinder. Compressed air is supplied to the air cylinder, so that the movable member is moved towards the rigidly arranged member. Upon further movement of the movable member, pressure is exerted on the package. Then, for a fixed time, the magnitude of the change in the air pressure in the air cylinder is observed. If the package leaks, gas will escape from the free space of the package along the sealing edges to the exterior, whereby a strong pressure drop will occur in the air cylinder, which would be substantially less if the package did not leak. Thus, it can be derived from the magnitude of the change in the pressure whether the seal of the package leaks or not.

This known method is intended for testing a package, partly filled with a product, that consists of a rigid or semi-rigid container which is closed along the upper edge with a sealing sheet. In fact, only this seal forms the flexible part of the package. As the pressure member compresses the seal, the free space in the package is put under pressure.

Owing to the relatively high degree of compressibility of gases, the sealing sheet of the package must also be compressed over a fairly large distance so as to obtain a sufficiently high pressure build-up in the free space of the package. Owing to the coupling of the movable ram to the piston in an air cylinder, the known apparatus is suitable for performing the relatively long stroke during the compression of the package. Owing to the likewise relatively large deflection of the measuring means that occurs upon compression of a leaking package, the presence of a leak in the package can be demonstrated with a sufficient degree of probability.

However, this renders the method less suitable for leak-testing packages which do not contain a free space filled with air or another gas, and, further, the apparatus used is not adapted to testing packages which are largely or entirely flexible.

The object of the invention is to provide an improvement of the method referred to, which enables reliable and quick leak-testing of packages filled entirely with liquid and in particular liquid-filled packages which are entirely flexible (sachets).

To that end, the method according to the invention is characterized in that the support member supports the package, substantially completely filled with a liquid product and placed thereon, by means of springs, the package is compressed by lowering the pressure member onto the package, the support member thereby being pressed downwards against the spring force acting on the support member, and the change in the spring force exerted on the support member is measured for a fixed measuring time for determining the possible leakage of liquid from the compressed package.

The invention further comprises an apparatus for testing a filled and closed flexible package for leakage, comprising a vertically movable support member for supporting the package to be placed thereon so as to be tested; a pressure member arranged above the support member and adapted for relative movement towards the support member; movement means for relatively moving the support member and the pressure member towards each other and thereby compressing the package disposed between these members; and measuring means for measuring the change in the pressure on the compressed package for a fixed time and for determining therefrom whether or not a leak is present in the package, characterized in that the support member is designed with springs for spring-supporting the package substantially completely filled with a liquid product, the pressure member is connected to the movement means for lowering the pressure member towards the package resting on the support member and for compressing the package between these two members, and the measuring means are designed for measuring for a fixed time the change in the spring force exerted by the support member on the compressed package.

The pressure member can be lowered in any desired manner, for instance hydraulically, pneumatically or mechanically. Preferably, the pressure member, after being lowered onto the package and compressing the package, is secured against further vertical movement, so that the pressure member becomes a rigid point. In order to ensure that, during measurement of the spring force of the support member, the package is stably located between the pressure member and the support member and the influence of possible disturbing influences of an incidental nature is reduced, it is desirable to initially compress the package at a slightly greater pressure than during the measurement of the spring force on the support member. To that end, the pressure member is slightly raised again after having been lowered to the lowermost position. In this position of the pressure member, it can be secured immovably, whereupon measurement of the spring force exerted on the support member can commence.

This spring force should be measured in an accurate manner while the influence of disturbing external factors such as internal friction of the springs or clearance of the support member is to be limited as much as possible so as to obtain reliable and representative measurements. A good choice for the support member is the platform of a weighing apparatus, in particular of an accurate scale.

According to a particular design of the invention, after the package has been placed on the platform and before the pressure member is lowered onto the package, the weight indication of the weight caused by the package bearing on the platform is reset to the weight indication that was shown before the package was placed on the platform. In this design, the influence of possible minor weight differences among packages of the same type is eliminated. Then, the invention can also be used without difficulty for testing packages of a different weight. Thus, in all cases, exclusively the pressure force exerted on the package by the pressure member is measured, independently of the weight of the package itself.

To enable proper comparison of the test results of series of identical packages, it is desirable to compress the packages not just locally, as for instance with a small-sized pressure plate or with pressure fingers, but to compress the packages completely, i.e., the compressed package will be located completely or virtually completely between the end faces of the support member and the pressure member. During compression of the package between these end faces, in addition to a reduction of the thickness of the package, the change in the shape of the package will mainly occur in lateral direction between the end faces, with avoidance of local recesses or bulges. For a proper comparison of the respective measuring results, it is moreover recommended that the end faces of the support member and the pressure member be designed flat and parallel and be moved in mutually parallel relationship during compression of the package.

The invention will be further explained, by way of example, with reference to the accompanying drawing schematically showing an apparatus according to the invention.

The drawing shows a spring balance 1 provided with a small reading window where the load bearing on the platform 2 of the balance is indicated electronically. Arranged above the platform is a pressure plate 3 connected to a screwed spindle 5. By means of a handwheel 7, this spindle 5 is rotatably mounted in a screw nut 6 arranged fixedly relative to the surroundings. By rotating the handwheel 7, the spindle 5, and hence the pressure plate 3 connected thereto, is moved up and down.

When the apparatus is used for testing a package 4 for leaks, the pressure plate 3 is raised by rotating the handwheel 7 so that the package can be placed on the platform 2. In this case, the package is a sachet formed from layers of thermoplastic foil and having a volume of 2 liters, which sachet has been sealed along the closing edges thereof after being filled up with a liquid coffee extract.

Optionally, after the package has been placed on the platform, the weight of the package is first checked on the reading window, as part of a general package check. After this weight check, the weight indication on the reading window is reset to zero. The pressure plate is now moved down with the screwed spindle 5 until the balance 1 indicates a load of approx. 25 kg, for instance. Then the pressure plate is moved up slightly, so that the load on the balance returns to a value selected as a starting load for the package, for instance 20 kg. At this value of the load, the spindle 5 is secured. It is also possible to design the spindle 5 and the screw nut 6 with self-gripping screwed thread or as a worm and worm gear, so that the use of separate securing means can be omitted.

In this situation, from a given initial time, the change in the load as visible on the reading window of the balance is observed for a selected measuring time, for instance 5 seconds. A relatively large drop in the load observed will point to leakage of liquid from the package, while the absence of a large pressure drop indicates the package does not leak.

It will be clear that in practice the invention can be of fully automatic design and driven and controlled by computers, with packages being continuously supplied and successively tested for leakage.

I claim:

1. A method for testing a filled and closed flexible package for leakage, in which the package is placed on a vertically movable support member, the package is subsequently compressed between the support member and a pressure member bearing on the top of the package as a result of relative movement of said support and pressure members toward each other, and the change of the pressure on the compressed package is measured for a fixed measuring period and from this measurement a presence or absence of a leak in the package is determined, characterized in that the support member is formed by a platform of a spring-acting weighing apparatus, and that the package, which is substantially filled with a liquid product, is placed on said platform and is compressed by lowering the pressure member onto the package, the platform thereby being pressed downwards against a spring force exerted by the weighing apparatus, and the change in said spring force is measured for said fixed measuring period for determining the possible leakage of said liquid product from said compressed package.

2. A method according to claim 1, characterized in that the pressure member is fixed after said pressure member has been lowered to a lowest point and raised over a slight distance while the package remains compressed.

3. A method according to claim 1, characterized in that after the package has been placed on the platform and before the pressure member is lowered onto the package, a weight indication caused by the weight of the package bearing on the platform is reset to a reset weight indication shown before the package was placed on the platform.

4. An apparatus for testing a filled and closed flexible package for leakage, comprising a vertically movable support member for supporting the package to be placed thereon for testing; a pressure member arranged above the support member and adapted for relative movement towards the support member; movement means for relatively moving the support member and the pressure member towards each other and thereby compressing the package disposed between these members; and measuring means for measuring a change in a pressure on the compressed package for a fixed period of time and for determining therefrom whether or not a leak is present in the package, characterized in that the support member is formed by a platform of a spring-acting weighing apparatus, that the pressure member is connected to the movement means for lowering the pressure member toward the package, which is substantially filled with a liquid product, and for compressing the package between the pressure member and the platform, and that the measuring means are adapted to measure for said fixed period of time the change in a spring force exerted by the platform of the weighing apparatus on the compressed package.

* * * * *